July 28, 1953
R. L. HANDY
2,647,178
STARTER SWITCH APPARATUS
Filed Dec. 5, 1950
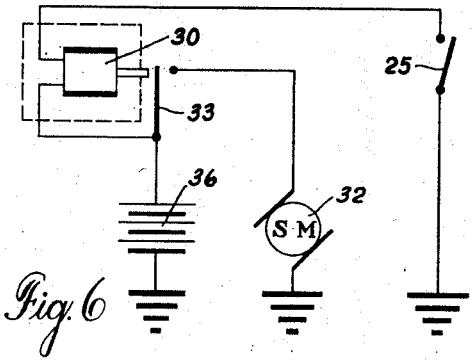
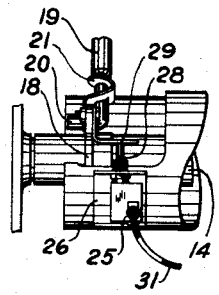
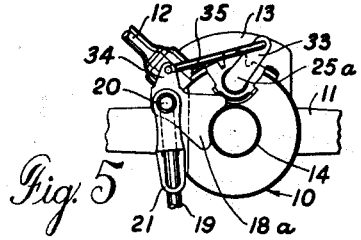
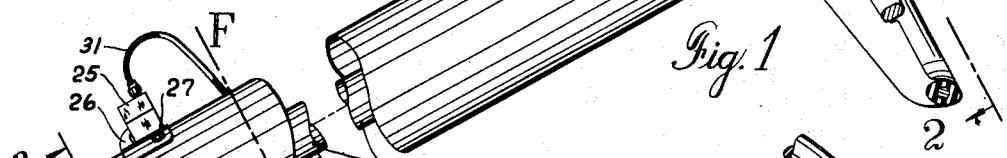
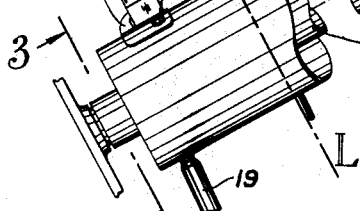
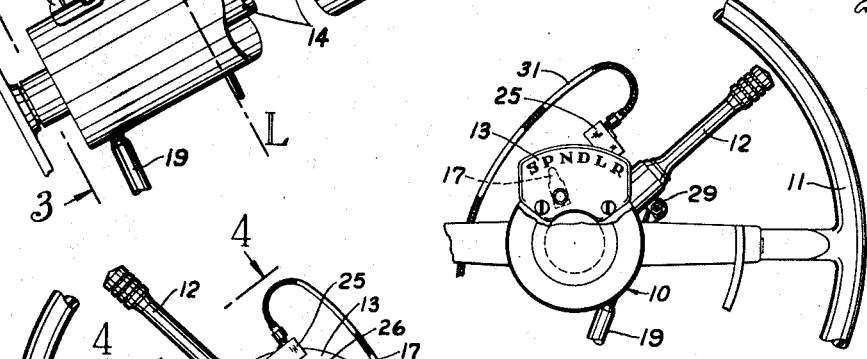
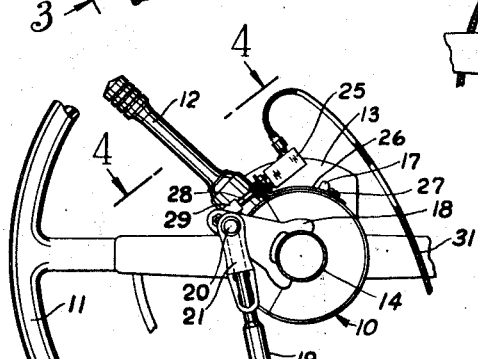
INVENTOR.
Ralph L. Handy
BY Brown, Jackson, Boettcher & Dienner
ATTORNEYS.

Patented July 28, 1953

2,647,178

UNITED STATES PATENT OFFICE 2,647,178

STARTER SWITCH APPARATUS

Ralph L. Handy, Mishawaka, Ind., assignor to The Studebaker Corporation, South Bend, Ind., a corporation of Delaware Application December 5, 1950, Serial No. 199,300

1 Claim. (Cl. 200—59)

My invention is concerned with a new and useful starter switch apparatus and remote control means for providing a safety interlock between an electric starting motor and an automatic transmission in automotive vehicles.

Briefly, my invention contemplates a remote control means operatively associated with a manually operated transmission gear selective or shift lever mounted on a steering column for controlling an automatic or similar type of transmission as presently employed in automobiles in the United States and elsewhere whereby a safety interlock means is provided by virtue of which the automobile's electric starter motor cannot be energized without first disengaging the transmission from an operating drive or propelling condition.

Since the recent introduction of hydraulic and other styles of automatic transmissions in automobiles, especially in the United States, it has become dangerously possible to start the automobile's engine with the transmission engaged in a driving position, which practice often results in the dangerous and unexpected movement of the vehicle.

It is the main purpose of my invention to disclose a starter switch apparatus and interlock means between the starting motor and transmission whereby it is not possible to energize the engine's starter motor without first disengaging the transmission from a driving or operating condition.

It is a further object of my invention to display a new, useful and convenient remote control means for starting an automobile especially adapted for use with an automobile equipped with an automatic transmission.

The various features, advantages and structural specifications of my invention will be recognized by one skilled in the art from the following detailed description of my invention and in particular with reference to the accompanying drawings.

In the drawings:

Figure 1 is a foreshortened front elevational view in partial cross section of an automobile's steering column showing the general arrangement of parts of my interlock means;

Figure 2 is a partial side elevational view looking downwardly at the steering column and steering wheel as indicated by the directional arrows 2—2 of Figure 1 and showing the manual shift control lever, transmission operating indicator and the positional relation of my remote control switch thereto;

Figure 3 is a partial side elevational view, similar to Figure 2, but looking upwardly at the base of the steering column in the direction of arrows 3—3 of Figure 1;

Figure 4 is a detailed partial front elevational view showing the arrangement of operating parts and linkages at the lower end of the steering column of Figure 1, looking in the direction of arrows 4—4 of Figure 3;

Figure 5 is a partial side elevational view similar to Figure 3 showing an alternate type of rotary switch employed in my interlock means; and Figure 6 is a representative circuit diagram showing a typical electrical circuit arrangement of my starting switch in the automobile's starting circuit.

Referring now to Figure 1 of the drawings, it will be recognized that an automobile steering column 10 is therein illustrated having a steering wheel 11 mounted for rotational movement at its upper end with a manual transmission gear selecting or shifting lever 12 and an operating position indicator plate 13 mounted directly below the steering wheel for convenient accessability to the driver; all in a conventional and recognized old manner which constitute by themselves no part of the contribution to the art of my present invention other than as structural elements of the overall combination.

Within steering column 10, however, is a hollow shaft 14 surrounding a steering shaft 15 and operatively connected at its upper end to shift lever 12 by a suitable connective means such as link 16 shown in the broken away section of Figure 1 at the upper end of the steering column. Manual arcuate movement of lever 12 by the driver serves to rotate shaft 14 and move attached indicator pointer 17 along the face of the position indicator plate 13 to the various operating positions indicated on the face of the latter, as shown clearly in Figure 2. The several letters S, P, N, D, L and R indicate the respective operating positions of the transmission for Start, Park, Neutral, Drive, Low and Reverse. The pointer 17 and lever 12 are resiliently but removably held in the several selected positions P, N, D, L or R by a suitable detent means, not shown, but associated with link means 16; such detent and link means being of a known construction and not part of my present invention. It should be noted that preferably there is no detent associated with the "S" or Start position and that lever 12 is held in this position manually by the driver, for purposes which will appear later herein.

As seen in Figure 3, rotation of shaft 14 in response to arcuate movement of lever 12 also serves to arcuately rotate a link 18 rigidly fastened near the lower end of shaft 14 and positioned transversely thereto below the floor board line designated F—L in Figure 1. As shown in Figure 4, a rod 19 is pivotally connected to the outer end of link 18 by means of such rod's upwardly turned end 20 and a resilient spring retaining clip 21. Of course it will be recognized that this actuating connection between shift lever 12 and rod 19 is of a known type with the rod 19 being joined to suitable shifting means to the transmission for conditioning the latter to operate in accordance with the positions selected on plate 13 by the driver.

It will further be observed from Figures 1-4 that a plunger type switch 25 is mounted on steering column 10 by means of a bracket 26 and bolt 27 located near the lower end of shaft 14 on the outside of the column 10. Switch 25 comprises the starter control switch for the automobile's starter motor circuit and is provided with a spring loaded plunger 28 adapted to be contacted and resiliently depressed by an upwardly turned finger member 29 mounted rigidly at the outer end of link 18 and projecting angularly outward therefrom. Closing operation of switch 25 by finger 29 is accomplished by arcuate actuation of control lever 12 to move pointer 17 to the "S" or Start position on plate 13. Such arcuate movement of lever 12 serves to rotate shaft 14 which in turn moves the outer end of link 18 and the attached finger 29 so that the latter member depresses the switch plunger 28 as illustrated in Figures 3 and 4. The switch 25 is, of course, connected electrically to the starting motor's conventional solenoid switch means 30 as by connective lead 31. Since there is no detent engaging link 16 of the manual shift mechanism to hold the shift lever 12 in the Start or "S" position, release of that lever after energizing the starter motor 32 serves to permit the spring associated with switch plunger 28 to return the shift lever 12 to the "P" position where the transmission is in a non-propelling or non-driving condition.

In Figure 5 I have illustrated an alternate switch means 25a of the rotary type which can be substituted readily for the plunger type switch 25 if desired. As will be recognized switch 25a is provided with a rotating arm member 33 which controls the opening and closing of contacts within the switch in a conventional manner; the arm 33 being spring loaded with a torsion spring or the like, not shown, so that release of the manual shift lever 12 permits this torsion spring to move the lever 12 and pointer 17 back to the "P" position as set forth above. In order to actuate switch 25a in response to arcuate movement of lever 12 to the "S" position I have provided a link 18a, similar to link 18, near the base of shaft 14; link 18a being provided with an outwardly extending ear 34 adapted to pivotally receive one end of a link rod 35 which has its other end pivotally joined to the outer end of the switch arm 33. Link 18a is additionally connected to rod 19 which connects with the conditioning mechanism for the transmission as before. By this arrangement it will be seen that arcuate actuation of lever 12 will serve to rotatably actuate switch 25.

Figure 6 illustrates diagrammatically a typical starting control circuit utilizing such a remote starting switch system as I have set forth. It will be recognized from that figure that closure of switch 25 or 25a permits the initial energization of the solenoid switch means 30 associated with the starting motor 32. The solenoid initially serves to engage a conventional motor starting gear (not shown) with the engine's flywheel and then closes normally open contacts or switch 33 to energize the starting motor 32 with power supplied from battery 36, all in a known manner. Release of the shift control lever permits the spring loaded plunger 28 to snap back to its normal open condition, opening switch 25 to deenergize the starting motor. As explained before, the return pressure of the spring associated with switch plunger 28 also serves to reversely rotate shaft 14 to move control shift lever 12 and indicator pointer 17 from the Start or "S" position back to the "P" position wherein the transmission is in a "ready" but non-driving condition. Likewise, if switch 25a is used, release of lever 12 allows spring loaded arm 33 thereof to return lever 12 and pointer 17 to the "P" position.

Thus it may be seen that I have provided a new and improved starter switch apparatus and interlock utilizing a remote starter control switch adapted to be actuated to start an electrical starting motor for an automobile or like vehicle, especially useful with automotive vehicles having automatic transmission with steering column transmission control levers; the starter switch being closed in response to movement of the transmission shift control lever to a selected position wherein the driver of the automobile is assured against starting the engine of the vehicle when the transmission is in a driving or engaged condition for propelling the vehicle.

While I have herein displayed a preferred embodiment of my invention, it readily will be understood that numerous changes, modifications and substitutions of equivalents may be made therein without departing from the spirit and scope of my invention. Therefore, I do not wish to be restricted to the specific embodiment herein described other than may appear in the following appended claim.

I claim:

For use in an automotive vehicle, a manually engageable transmission gear shifting lever mounted for limited arcuate movement adjacent the upper end of the vehicle's steering column, a starter switch, in circuit with the vehicle's starter motor and arranged to control the energization and deenergization thereof, mounted adjacent the lower end of said steering column; a rotatably mounted tubular shaft member disposed concentrically within said steering column, link means connecting one end of said shaft member to said lever whereby arcuate manipulation of the latter serves to rotate the tubular shaft member correspondingly, detent means arranged with said lever for yieldingly retaining the same and said shaft at a plurality of successive positions in their arcuate travel, a second link means rigidly connected transversely to the other end of said shaft member and arranged to operatively interconnect said shaft member with said switch means in a manner whereby closure of said switch takes place only in response to manipulation of said lever to one end of its path of arcuate travel.

RALPH L. HANDY.

References Cited in the file of this patent

UNITED STATES PATENTS

| Number | Name | Date |
|---|---|---|
| 2,179,368 | Baade | Nov. 7, 1939 |
| 2,324,819 | Butzbach | July 20, 1943 |
| 2,516,208 | Hasbany | July 25, 1950 |